United States Patent
Stevens

(10) Patent No.: US 7,624,780 B2
(45) Date of Patent: *Dec. 1, 2009

(54) LAMINATOR

(75) Inventor: Hans-Gerd Stevens, Bocholt (DE)

(73) Assignee: Meier Solar Solutions GmbH, Bocholt (DE)

( * ) Notice: Subject to any disclaimer, the term of this patent is extended or adjusted under 35 U.S.C. 154(b) by 337 days.

This patent is subject to a terminal disclaimer.

(21) Appl. No.: 11/597,853

(22) PCT Filed: Jun. 9, 2005

(86) PCT No.: PCT/EP2005/006192

§ 371 (c)(1),
(2), (4) Date: Nov. 28, 2006

(87) PCT Pub. No.: WO2006/000300

PCT Pub. Date: Jan. 5, 2006

(65) Prior Publication Data

US 2007/0215287 A1    Sep. 20, 2007

(30) Foreign Application Priority Data

Jun. 24, 2004   (DE) ................ 10 2004 030 658

(51) Int. Cl.
- B29C 65/00 (2006.01)
- B30B 5/02 (2006.01)
- B30B 5/04 (2006.01)
- B30B 15/34 (2006.01)
- B29C 47/76 (2006.01)
- B30B 9/00 (2006.01)

(52) U.S. Cl. .............. 156/382; 156/286; 156/583.1; 264/102; 100/90; 100/322

(58) Field of Classification Search ............ 156/99, 156/285, 286, 381, 382; 264/101, 102; 100/90; 414/939

See application file for complete search history.

(56) References Cited

U.S. PATENT DOCUMENTS

| 3,322,598 A | * | 5/1967 | Marks Alvin Metal. ...... 156/382 |
| 3,964,958 A | * | 6/1976 | Johnston ...................... 156/382 |
| 4,273,604 A | * | 6/1981 | Johnston ...................... 156/382 |

(Continued)

FOREIGN PATENT DOCUMENTS

DE    41 12 607    10/1992

(Continued)

Primary Examiner—Richard Crispino
Assistant Examiner—Brian R Slawski
(74) Attorney, Agent, or Firm—Greer, Burns & Crain Ltd

(57) ABSTRACT

The inventive laminator for laminating structural components, in particular solar module cells or laminated glass panes by combining pressing force and heat, wherein said laminator comprises at least one laminating chamber for receiving one or several structural components, which is provided with a support for said structural components, a heating unit and with a flexible compression membrane which is sealingly stretched in the chamber above the structural element support and is movable with respect thereto. Said membrane separates a lower part of the chamber from a top part thereof, thereby enabling each part to be void of air and aerated. The inventive laminator is characterised in that the copression membrane is embodied in the form of a multiple membrane consisting of a plurality of superimposed membranes.

20 Claims, 1 Drawing Sheet

U.S. PATENT DOCUMENTS

| | | | |
|---|---|---|---|
| 4,652,319 A * | 3/1987 | Hammond | 156/94 |
| 4,874,449 A * | 10/1989 | Schaefer et al. | 156/246 |
| 5,116,216 A * | 5/1992 | Cochran et al. | 425/504 |
| 5,131,834 A * | 7/1992 | Potter | 425/389 |
| 5,618,606 A * | 4/1997 | Sherrick et al. | 428/113 |
| 6,146,578 A | 11/2000 | Van Ert et al. | |
| 6,406,659 B1 * | 6/2002 | Lang et al. | 264/510 |
| 6,481,482 B1 * | 11/2002 | Shimotomai | 156/366 |

FOREIGN PATENT DOCUMENTS

| | | |
|---|---|---|
| EP | 1 327 519 | 7/2003 |
| WO | WO 90/12683 | 11/1990 |
| WO | WO 94/29106 | 12/1994 |

* cited by examiner

LAMINATOR

BACKGROUND OF THE INVENTION

This invention relates to a laminator for laminating structural components, in particular solar module cells or laminated glass panes by combining pressing force and heat, wherein said laminator comprises at least one laminating chamber for receiving one or several structural components which is provided with a support for said structural components, a heating unit and with a flexible compression membrane which is sealingly stretched in the chamber above the structural element support and is movable with respect thereto, separating a lower part of the chamber from a top part thereof, thereby enabling each part to be void of air and aerated.

A laminator of the initially mentioned type is known from WO 94/29106 A1. The compression membrane which serves to produce the pressing force acting upon the structural component during a laminating process is subject to mechanical, thermal and chemical loads during the operation of the laminator. The mechanical loads result from the movements of the compression membrane due to different pressure conditions in the two parts of the chamber on both sides of the compression membrane as well as by pressing the compression membrane to the structural component to be laminated in each case. Thermal loads result due to the heat applied during the laminating process to which the compression membrane is also exposed. The chemical load of the compression membrane results from gases which are released during the laminating process from the structural component to be laminated. Over time, these mechanical, thermal and chemical influences on the compression membrane result in wear which finally results in leakiness of the compression membrane, for example due to rupture. Due to leaky areas of the compression membrane, air can pass during the laminating process in an uncontrolled and undesirable manner from the top part of the chamber into the lower part of the chamber void of air which results in errors or defects on the laminated structural component and thus in the production of rejects. Since with the known laminator, leakiness of the compression membrane is only to be detected in subsequent quality control of the laminated structural components, it is possible that, for a certain time, work is continued with a leaky membrane so that reject products will be produced with the laminator to a greater extent. This is uneconomical and therefore undesirable.

To remedy this disadvantage, it is standard operating practice to prophylactically replace the compression membrane in a laminator after a certain number of laminating processes, irrespective of whether damages on the compression membrane already occurred or not. This will, in fact, prevent the production of rejects; however, frequently, a still intact compression membrane will be replaced so that relatively high costs for spare membranes will be incurred which is also detrimental for the efficiency of operation of the laminator.

From DE 199 20 577 C1, a membrane press is known for the coating of workpieces with a thin coating material, with a lower pressing table, an upper pressing table, an elastic membrane lowerable onto a workpiece covered with the coating material and to be coated therewith, the membrane forming a pressure-proof chamber with a pressing table, and with channels for the inlet and outlet of a fluid admitted to the membrane, and with a press control. It is provided that the press comprises two supply tanks for two fluids with different temperature adjustment, provided with working valves which can be controlled to be opened and closed by the press control, and that the membrane press comprises a conveying device for the fluids. In one embodiment of this membrane press, below a first membrane, a second elastic membrane is provided which forms, via a frame with the first membrane, a second pressure-proof chamber into which a working fluid can be pressed through inlets and outlets depending on the individual process steps. With this membrane press as well, any leakiness in one of the membranes results in an impairment of the function of the membrane press and thus the production of rejects or a standstill of the press. Here again, reliable operation can only be ensured through a regular prophylactic replacement of the membranes which is complex and expensive.

SUMMARY OF THE INVENTION

Accordingly, the objective is presented for this invention of providing a laminator of the initially specified type which avoids the above presented disadvantages and which safely prevents, in particular, a production of rejects and at the same time ensures an efficient operation.

The problem is solved in accordance with the invention with a laminator of the initially indicated type which is characterized in that the compression membrane is embodied in the form of a multiple membrane comprising a plurality of superimposed membranes.

The compression membrane designed as a multiple membrane offers the advantage that—in case of a leak of the membrane facing the structural component to be laminated—there will always be still one or several additional membranes within the compression membrane which provide overall for the necessary tightness of the compression membrane. Only the membrane coming into contact with the structural component within the compression membrane is subject to chemical influences while the other membranes within the compression membrane are protected against the chemical influences through the membrane coming into contact with the structural component. The mechanical and thermal loads are also greatest on the membrane facing the structural component within the compression membrane. This will ensure that the membrane—within the multilayer compression membrane—which comes into contact with the structural component in the operation of the laminator will in any case first become defective whereas the other membranes within the multilayer compression membrane, after an identically long application period, do not yet show any damages, especially no leakiness, due to their lower load and strain. Thus will be achieved that—even in case of a leakiness of the membrane coming into contact with the structural component within the multilayer compression membrane—the production will remain defect-free, and a longer uninterrupted operation of the laminator can be achieved. Checking the membrane respectively facing the structural component within the multilayer compression membrane can be advantageously done within the scope of the usual regular maintenance when the laminator is not in operation anyway. Additional standstill times for any unscheduled or prophylactic replacement of the membrane will thus be avoided. Each membrane can be used until the onset of a damage, especially leakiness, and even beyond that which provides an optimum utilization of the service life of the membranes. Thus, the laminator according to the invention provides especially high reliability regarding the production of rejects, as well as especially economic operation with low costs for spare membranes.

A preferred further development proposes that a space each between two adjacent membranes each of the compression membrane is void of air in the operation of the laminator, and that the adjacent membranes directly contact each other over their surface. Thus, the membranes are combined in their surface without being firmly connected in their surface, according to which the compression membrane designed as a multiple membrane will largely perform as a single-layer membrane in the operation of the laminator; undesirable changes in the handling and operation of the laminator will thus be avoided.

The compression membrane is preferably designed as a double membrane with two superimposed membranes. This design provides a good compromise between the intended reliability of the production process on the one hand and the intended high efficiency of operation of the laminator on the other hand.

It is furthermore advantageously provided that the superimposed membranes are identical in design among each other. Thus, a single type of membrane will be sufficient for the operation of the laminator which keeps the expenditure for the manufacture and for the storage of membranes advantageously low. Also, sources of error will thus be avoided which would result with an application of different membranes within the multilayer compression membrane.

Alternatively, the superimposed membranes can be designed differently from each other, especially of different materials. Here, advantageously, an adjustment is possible of the properties of the individual membranes to the different requirements respectively made in the multilayer compression membrane in accordance with its position.

To keep the laminator mechanically as simple as possible and to be also able to retrofit existing laminators in accordance with the laminator according to the invention, it is furthermore preferably provided that the superimposed membranes are replaceably stretched into a joint membrane carrying frame. In this embodiment of the laminator, an already existing membrane carrying frame—into which a single-layer compression membrane had so far been stretched—can be advantageously used for stretching in the multilayer compression membrane of a plurality of individual membranes.

A particularly simple handling of the compression membrane and a particularly simple replacement against a conventional single-layer compression membrane will be achieved by a design in which the superimposed membranes are prefabricated to the compression membrane by a circumferential connection provided in advance on the edge, especially a fusible or adhesive connection.

Alternatively to the joint holding of the membrane will be proposed that the superimposed membranes are replaceably stretched each into an own membrane carrying frame. In this embodiment, replacement of a leaky membrane by a new membrane will be simplified because not several but only one single membrane must be removed from the corresponding membrane carrying frame and only one single new membrane must be built into it.

An advantageous further embodiment of the laminator provides that a device is connected to one/the space—between two adjacent membranes each of the compression membrane—for measuring the pressure in the space. Via this pressure measuring device, information on the condition of the compression membrane can be obtained in a simple and reliable manner.

In a further embodiment, a pressure indicating device perceptible for the operating personnel of the laminator can be series connected to the device for measuring the pressure in the space. Damages of the compression membrane which are expressed by pressure changes in the space can thus be quickly detected, and the necessary measures can be introduced or scheduled.

Alternatively or additionally, an analysis unit can be series connected to the device for measuring the pressure in the space by means of which an alarm can be triggered in case of a pressure occurring in the space which exceeds or falls below a specifiable limit value. In this embodiment, the operating personnel will be relieved since the analysis unit will take over the task of detecting a damage case and informing about it by raising an alarm.

The device in its various designs for measuring the pressure in the space will provide, in each case, the possibility of reliably determining leaks in one of the membranes, in particular in the especially stressed membrane coming into contact with the structural component. As explained already further above, even in case of the detection of a leak—e.g. in that membrane within the multilayer compression membrane which comes into contact with the structural component—the operation of the laminator can still continue for the time being since at least one other membrane within the multilayer compression membrane still takes care of the required leakproofness of the compression membrane. Provisions must only be made that, with the next opportunity, especially the next regular maintenance of the laminator, the leaky membrane will be replaced by a new membrane. The device for measuring and for the pressure in the space provides for an early detection of membrane leaks before they can be detected with the naked eye by the operating personnel of the laminator. This ensures a particularly safe operation of the laminator which largely excludes the production of rejects.

Furthermore according to the invention, it is preferably provided that the laminator comprises a base with the lower part of the chamber, the structural component support, and the heating unit, and a cover-type top with the top part of the chamber and the compression membrane, and that the top is adjustable between an open position raised from the base and a closed position lowered to the base. In the open position of the top of the laminator, the compression membrane—especially the membrane of the multilayer compression membrane which is respectively facing the structural component to be laminated—is easily accessible for the operating personnel. A replacement of one membrane or a plurality of membranes of the multilayer compression membrane is thus possible in a relatively easy manner, especially without any complex disassembly of parts of the laminator. Raising and lowering of the top can here be done, for example, linearly in vertical direction or by means of a swivel movement. Even horizontal or a combined vertical and horizontal movement of the top relative to the base is possible for opening and closing the laminator. Instead of the top, the base can also be the adjustable part of the laminator, with the top then being positioned in a stationary manner. For the displacement of top and base relative to each other, a power drive on the laminator is expediently used and as known per se.

Another embodiment of the laminator provides that a device for the evacuation and/or aeration of the space is connected to a space between two adjacent membranes each of the compression membrane. With this device, the space can be void of air with laminator-own means in a desired manner for the operation of the laminator. Moreover, this device can facilitate the insertion or removal of a membrane. Furthermore, an additional possibility is created for checking the tightness of the membranes, by generating—for example within the scope of maintenance work—excess pressure in the space or in the spaces to then observe whether the pressure remains constant or decreases.

Another embodiment of the laminator provides that a device 30 for the evacuation and/or aeration of the space 25 is connected to the space between the two adjacent membranes 2.1, 2.2. With this device 30, the space can be void of air with laminator-own means in a desired manner for the operation of the laminator. Moreover, this device 30 can facilitate the insertion or removal of a membrane. Furthermore, an additional possibility is created for checking the tightness of the membranes, by generating—for example within the scope of maintenance work—excess pressure in the space or in the spaces to then observe whether the pressure remains constant or decreases.

Finally, it is also provided for the laminator according to the invention that the device 30 for the evacuation and/or aeration of the space comprises the line 27 and valve arrangement 32, as well as a vacuum pump 34, and that—by means of this or another line 14, 24 and valve arrangement 36 and by means of this vacuum pump 38—the lower part and the top part of the chamber as well can each be void of air and aerated. In this embodiment, the laminator 1 requires, for the evacuation of the two chamber parts and the space, only one single vacuum pump 34 which will keep low the technical expenditure and thus the costs for the laminator. By means of the mentioned line and valve arrangements, the optimum pressures required for the appropriate operating condition of the laminator can be adjusted in the two parts of the chamber and in the space between the membranes; this pressure adjustment being expediently automatically done by a control device 40.

BRIEF DESCRIPTION OF THE DRAWINGS

In the following, one exemplified embodiment of the invention will be explained by means of a drawing. The single FIGURE of the drawing shows a laminator in a diagrammatic longitudinal section.

DETAILED DESCRIPTION OF THE DRAWINGS

Figure 1:
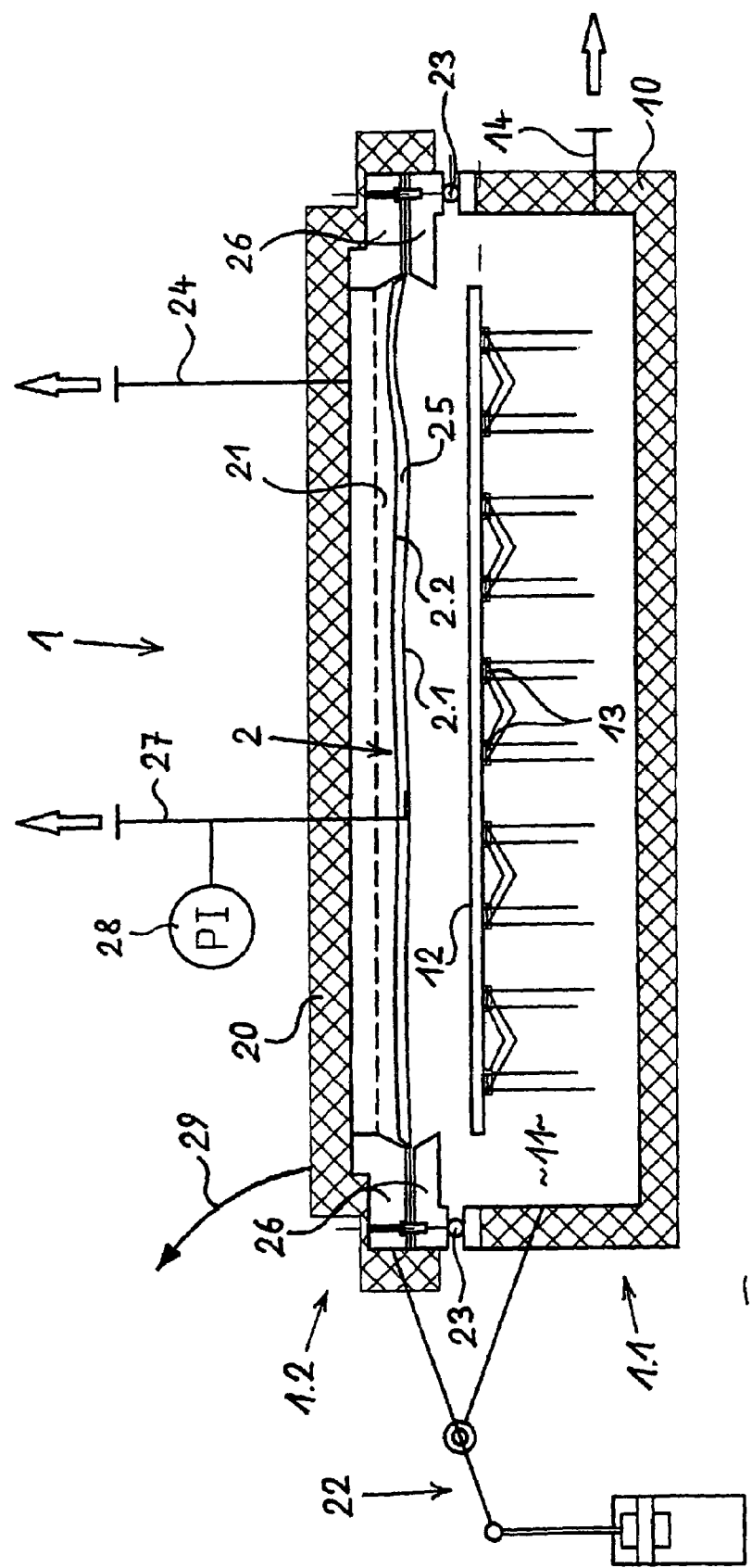

As is shown in the figure of the drawing, the laminator 1 in the presented exemplary embodiment comprises a base 1.1 and a top 1.2 swivable relative thereto by means of a power operated mechanism 22 in the sense of the arrow 29.

In the closing position—shown in the drawing FIGURE—of the top 1.2, it rests airtight on the base 1.1 under the intermediate layer of a circumferential seal 23.

On the inside of the base 1.1, there is a structural component support 12 with horizontal alignment which is provided on the underside with a heating unit 13 for heating the structural component support 12. The structural component support 12 is formed, for example, by a metal plate with a smooth top, preferably of steel. The heating unit 13 can be e.g. an electric heating unit, or a heating unit which works with a fluid heating medium. If it is necessary for the operation of the laminator 1, the unit 13 can also simultaneously have a cooling function or be supplemented by an additional cooling device. Toward the outside, the base 1.1 is limited by a closed and heat insulating housing 10.

The top 1.2 of the laminator 1 is here designed in the form of a cover 20 which is also closed towards the outside, as well as provided with a thermal insulation.

On the inside of the top 1.2, at a distance and approximately parallel to its underside, a compression membrane 2 is provided which is designed with two layers and comprises one lower membrane 2.1 as well as one upper membrane 2.2 arranged parallel with the lower one. More than two membranes 2.1, 2.2 can, of course, also be used. The membranes 2.1 and 2.2 of the compression membrane 2 are sealingly stretched circumferentially on the edge in a joint membrane carrying frame 26. The membranes 2.1 and 2.2 can be two individual parts or, alternatively, they can be connected with each other circumferentially on their edge, e.g. by fusion or adhesion.

The membrane carrying frame 26 is, in turn, sealingly connected with the cover 20 of the top part 1.2, preferably removably screwed.

With the laminator 1 closed, the interior of the laminator 1 is separated into a lower part of the chamber 11 and a top part of the chamber 21 by means of the compression membrane 2, with the two parts of the chamber 11, 21 being separated air-tight from each other and from the outer surroundings.

For laminating a structural component in the laminator 1, a structural component to be laminated of a plurality of layers to be laminated with each other is placed—with lifted top 1.2—on the upper side of the structural component support 12. Subsequently, the laminator 1 is closed air-tight by lowering the top 1.2. The interior of the laminator 1—namely its chamber parts 11 and 21—will be void of air via lines 14 and 24 which lead to one joint or each their own vacuum pump which is not presented here. In this manner, air inclusions will be prevented within the structural component to be laminated. At the same time, the structural component will be heated by the heating unit 13 which heats the structural component support 12 to a temperature required for the laminating process.

After the required heating period, the compression membrane 2—by means of aeration of the top part of the chamber 21—is applied, due to the pressure difference between the two parts of the chamber 11 and 21, to the side of the structural component facing to the top, and will exert a pressing force on it which is directed against the structural component support 12. After a sufficient pressing time, the lower partial chamber 11 will also be aerated, and the top 1.2 will be lifted from the base 1.1. The completely laminated structural component can be removed from the laminator 1, and a new structural component to be laminated can be placed into the laminator 1.

In the laminating process, the lower membrane 2.1—here facing the structural component on the structural component support 12—is subject to the maximum load, with mechanical loads occurring due to the membrane movements, thermal loads due to the heat of the structural component support and the structural component, and chemical influences due to the gases released during the laminating process. Thus, the lower membrane 2.1. within the multilayer compression membrane 2 is also subject to the highest wear during operation of the laminator 1. Over time, the wear will result in the lower membrane 2.1 of the multilayer compression membrane 2 becoming leaky. However, in the operation of the laminator 1, this has no directly negative consequence because the top-arranged second membrane 2.2 of the multilayer compression membrane 2 will still ensure the necessary tightness. This will be ensured due to the upper membrane 2.2—which is actually protected by the lower membrane 2.1—being subjected to lower mechanical, thermal and chemical loads so that a longer service life can here be expected, in any event, for the upper membrane 2.2 than for the lower membrane 2.1.

The occurrence of a leakiness in the lower membrane 2.1 can be detected by means of a line 27 and a pressure indicator 28 connected with it. The line 27 ends in a space 25 between the lower membrane 2.1 and the upper membrane 2.2 of the compression membrane 2. In the normal operation of the laminator 1, the space 25 is void of air, whereby the membranes 2.1 and 2.2 of the compression membrane 2 are in contact with each other over the surface without entering into a permanent connection with each other in their surface, and the compression membrane 2 then practically acting like a single-layer membrane. With a leakiness of the lower membrane 2.1, the pressure in the space 25 will change because air enters into the space 25 which is apparent for the operating personnel of the laminator 1 by means of the pressure indicator 28. Yet, the operation of the laminator 1 can continue until an anyway scheduled maintenance, e.g. on the weekend during standstill periods of the laminator 1. Within the scope of maintenance, the defective lower membrane 2.1 can then be removed and replaced by a new membrane.

The new membrane will then be preferably installed as the upper membrane 2.2 and the former upper membrane 2.2 will thereby become the new lower membrane 2.1. Thus, the membranes 2.1 and 2.2 can be used for their maximum possible service life—namely until the actual onset of a leakiness and even for a certain period of time beyond that—and need not be prophylactically replaced early.

Should the lower membrane 2.1 not only become leaky during the running operation of the laminator 1 but even tear and would then no longer form a smooth surface, there is the possibility of removing this torn membrane 2.1 initially only by cutting it out parallel with the membrane carrying frame 26 to ensure continued production without any major time delay. For the relatively short time until the next regular maintenance, operation of the laminator 1 can be accepted with a compression membrane 2 which comprises one membrane less than in normal operation. This is applicable especially when the compression membrane 2 comprises more than two membranes.

Aside from the pressure indicator 28, the line 27 is here also connected with its own or with the vacuum pump already mentioned above, to be able to void of air or aerate, as needed, the space 25 between the membranes 2.1 and 2.2 of the compression membrane 2.

In the tilted up condition of the top 1.2, an exchange of the membrane 2.1 or the membrane 2.2 or of both membranes 2.1 and 2.2 is easily possible since the membrane carrying frame 26 as well as the membranes 2.1 and 2.2 of the compression membrane 2 are then well accessible for the maintenance personnel.

The accommodation of a double-layer or multilayer compression membrane 2 with two or more individual membranes 2.1, 2.2 is possible without any problems within the laminator 1 so that even an already existing laminator 1 can accept, in its membrane carrying frame 26, a double-layer or multilayer compression membrane 2 instead of a so far usual single-layer membrane, without any further technical changes on the laminator 1 being required. Thus, with minor additional technical expenditure, higher reliability and better efficiency can be achieved even with laminators already being used.

Another embodiment of the laminator 1 provides that a device 30 for the evacuation and/or aeration of the space 25 is connected to the space between the two adjacent membranes 2.1, 2.2. With this device 30, the space can be void of air with laminator-own means in a desired manner for the operation of the laminator. Moreover, this device 30 can facilitate the insertion or removal of a membrane. Furthermore, an additional possibility is created for checking the tightness of the membranes, by generating—for example within the scope of maintenance work—excess pressure in the space 25 or in the spaces to then observe whether the pressure remains constant or decreases.

Alternatively or additionally, an analysis unit 42 can be series connected to the device 28 for measuring the pressure in the space by means of which an alarm can be triggered in case of a pressure occurring in the space 25 which exceeds or falls below a specifiable limit value. In this embodiment, the operating personnel will be relieved since the analysis unit 42 will take over the task of detecting a damage case and informing about it by operating an alarm 44.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A laminator for laminating structural components, wherein the laminator comprises:
   at least one laminating chamber,
   at least one structural component received in the laminating chamber and which is provided with a support for the structural component,
   a heating unit received in the laminating chamber, and
   a flexible compression membrane which is sealingly stretched in the chamber above the structural element support and is movable with respect thereto, separating a lower part of the chamber from a top part thereof, thereby enabling each part to be alternatively voided of air and aerated,
   the compression membrane being embodied in the form of a multiple membrane comprising a plurality of superimposed membranes,
   at least one space being provided between two adjacent membranes of the compression membrane, which is void of air during the operation of the laminator,
   the adjacent membranes being in direct contact with each other over their surfaces, and
   a device being connected to the at least one space, for measuring a pressure in the space.

2. The laminator according to claim 1, wherein the compression membrane is designed as a double membrane with two superimposed membranes.

3. The laminator according to claim 1, wherein the superimposed membranes are formed identical to each other.

4. The laminator according to claim 1, wherein the superimposed membranes formed differently from each other.

5. The laminator according to claim 4, wherein at least two of the superimposed membranes are formed of different materials from each other.

6. The laminator according to claim 1, wherein the superimposed membranes are replaceably stretched into a joint membrane carrying frame.

7. The laminator according to claim 1, wherein the superimposed membranes are prefabricated to form the compression membrane by a circumferential connection provided at their outer edge.

8. The laminator according to claim 7, wherein the circumferential connection comprises a fusing of the superimposed membranes.

9. The laminator according to claim 7, wherein the circumferential connection comprises an adhesive connection of the superimposed membranes.

10. The laminator according to claim 1, wherein each of the superimposed membranes is replaceably stretched into a separate membrane carrying frame from the other superimposed membranes.

11. The laminator according to claim 1, wherein a pressure indicating device is connected in series to the device for measuring the pressure in the space.

12. The laminator according to claim 1, wherein an analysis unit is connected in series to the device for measuring the pressure in the space, by means of which an alarm is triggered upon a pressure occurring in the space which exceeds or falls below a specifiable limit value.

13. The laminator according to claim 1, wherein the laminator comprises a base including the lower part of the chamber, the structural component support, and the heating unit, and a cover-type top including a top part of the chamber and the compression membrane, and the cover-type top is adjustable between an open position raised from the base and a closed position lowered to the base.

14. The laminator according to claim 1, wherein a device for at least one of evacuation and aeration of the space is connected to the space between the two adjacent membranes.

15. The laminator according to claim 14, wherein the device for at least one of the evacuation and aeration of the space comprises a line and valve arrangement, as well as a vacuum pump.

16. The laminator according to claim 15, wherein by means of the line and valve arrangement and the vacuum pump, the lower part and the top part of the chamber can each be alternatively voided of air and aerated.

17. The laminator according to claim 1, wherein by means of a line and valve arrangement and by means of a vacuum pump, the lower part and the top part of the chamber can each be alternatively voided of air and aerated.

18. A laminator for laminating structural components, wherein the laminator comprises:
   a laminating chamber,
   a structural component with a support received in the laminating chamber,
   a heating unit received in the laminating chamber,
   a flexible compression membrane, formed of a plurality of superimposed membranes, which is sealingly stretched in the chamber above the structural element support and is movable with respect thereto, separating a lower part of the chamber from a top part thereof, thereby enabling each part to be alternatively voided of air and aerated,
   at least one space being provided between two adjacent superimposed membranes of the compression membrane, and
   a pressure measuring device being operatively connected to the space.

19. The laminator according to claim 18, wherein a pressure indicating device is connected in series to the device for measuring the pressure in the space.

20. The laminator according to claim 18, wherein an analysis unit is connected in series to the device for measuring the pressure in the space, by means of which an alarm is triggered upon a pressure occurring in the space which exceeds or falls below a specifiable limit value.

* * * * *